United States Patent [19]

Hiers

[11] Patent Number: 5,278,002
[45] Date of Patent: Jan. 11, 1994

[54] BATTERY COVER

[75] Inventor: John J. Hiers, Elkin, N.C.

[73] Assignee: Lydall, Inc., Manchester, Conn.

[21] Appl. No.: 948,319

[22] Filed: Sep. 22, 1992

[51] Int. Cl.⁵ .................... H01M 10/50; H01M 2/02
[52] U.S. Cl. .................................. 429/175; 429/120; 429/177
[58] Field of Search .................... 429/175, 177, 120

[56] References Cited

U.S. PATENT DOCUMENTS

| | | | |
|---|---|---|---|
| 3,408,234 | 10/1966 | Ririe, Jr. | 129/120 |
| 3,825,447 | 6/1972 | Kraals | 429/175 |
| 4,255,502 | 3/1981 | Taylor, III | 429/120 |
| 4,840,855 | 6/1989 | Foti et al. | 429/120 |
| 5,212,025 | 5/1993 | Shibata et al. | 429/120 |

Primary Examiner—Marianne M. Cintins
Assistant Examiner—John Peabody
Attorney, Agent, or Firm—Griffin Butler Whisenhunt & Kurtossy

[57] ABSTRACT

A protective and at least in part heat-insulating cover for a battery, especially an automobile battery disposed in an automobile, having a pleasing appearance, and having a molded, rigid plastic support with at least a top wall and side walls, which walls are sufficiently rigid so as to be self supporting. Heat insulation is disposed on at least a portion of at least one wall and an envelope of plastic material encloses the insulation. Attachments attach the envelope to at least a portion of at least one wall.

24 Claims, 3 Drawing Sheets

BATTERY COVER

The present invention relates to a cover for a battery, and more particularly to such a cover which provides protective and, at least in part, heat insulating features. More particularly, the invention relates to a cover for an automobile battery and one which has a pleasing appearance.

BACKGROUND OF THE INVENTION

Electrical storage batteries must often operate in hostile environments, especially those environments of high temperature. The electrical current output of such batteries and the reliability of the batteries are strongly dependent upon the temperature of the battery and high temperature environments can very substantially adversely affect the operation and reliability of the battery. High temperatures can cause failure of the grid system of the electrode plates and, hence, failure of the battery.

While the present invention is broadly applicable to a cover for batteries, the above-noted hostile environment and, particularly, high temperatures of the battery are increasingly encountered in modern automobiles, especially in hot climates, and for the sake of conciseness, that particular application of the present cover will be discussed hereinafter, although it is to be understood that the present invention is not limited thereto.

In this regard, there is a considerable effort in the art to downsize modern automobiles. This downsizing has resulted in more and more restrictions on space available under the hood of an automobile for placement of the automobile battery. The position of the battery placement is often referred to in the art as the "real estate" occupied by the battery, and in view of the shrinking total real estate under the hood of a modern automobile, the battery has been placed closer and closer to other operating mechanisms under the hood. Many of those operating mechanisms generate substantial heat, e.g. the manifold, and when the real estate of the battery is in close proximity to such heat-generating devices, in operation of the automobile, the battery may be heated by those devices to unacceptable temperatures. Also, and just as importantly, modern automobiles have smaller and smaller air-intake grills, or no grill at all, and this engenders increased and severe operational temperatures and the resulting reliability difficulties. This is especially true when the automobile is operated in hot climates.

In contrast to the modern automobile, older larger automobiles have considerable total real estate under the hood, and the real estate occupied by the battery could be spaced far from any heat-generating devices. Those older automobiles also had generous air-intake grills. Thus, the air flow around the battery during movement of the automobile was more than sufficient to keep the battery cool and to keep the battery at essentially the same temperature throughout. This luxury of real estate and large grills is no longer available in modern automobiles, and increasing difficulties have been encountered in the operation and reliability of the battery, as the battery real estate is moved closer and closer to such heat-generating devices and grills shrink or disappear.

Some automobile manufacturers have addressed this problem by moving the battery from under the hood to, for example, under the rear seat. However, while this solves the problem of overheating of the battery, it engenders other problems of considerable difficulty, e.g. lack of easy access, the possibility of toxic battery fumes entering the passenger compartment, and the difficulty of servicing that battery. For these reasons, it is particularly desired to retain the battery real estate under the hood of the automobile, but to, at the same time, mitigate the difficulties encountered in the higher temperature environments.

To this end, the art has proposed battery covers, but prior art battery covers have not been successful and have not been widely adopted in automobile manufacture. Some of such battery covers are simply insulating blankets, but such insulating blankets have the difficulty of being damaged by ordinary operation and maintenance of the motor vehicle, e.g. damaged by oil and water, or damaged in removing and replacing the blankets from the battery when servicing the battery. The blankets, being bulky, also occupy too much real estate and are unsightly.

The art has also proposed rigid molded plastic battery boxes in which a top lid or portion of the box is removable for insertion of the battery. While these battery boxes do provide some measure of protection to the battery, the molded plastic boxes do not have significant thermal insulation, and the thermal problem, noted above, continues to exist. This is true even with such boxes which have double walls with an insulating air space therebetween. In addition, in order to slip the battery in and out of the battery box, there must be sufficient clearance between the inside walls of the battery box and the battery for ease of that movement. This results in the total real estate occupied by the battery and battery box to be greater than the real estate occupied by the battery alone, and such significant increase in real estate is not desirable in modern automobiles.

While such a battery box could be constructed of an insulating material, such insulating material must be of reasonable thicknesses in order to provide substantial insulation, e.g. at least one quarter inch or one half inch thick, and such an insulated battery box substantially further increases the total real estate occupied by the battery and insulated battery box, which is undesirable in view of the efforts in the art to conserve the real estate under the hood. Further, while such an insulated battery box could prevent heat passing from a nearby heated device, e.g. a manifold, to the battery, that same insulated battery box will, to a large measure, reduce the cooling effect for the battery by air flowing over that battery box when the automobile is moving. This is true even when an air duct is directed toward the battery, since the cooling effect thereof is not sufficient and the cost of such ducting in undesired. Further, ducting systems for cooling effectively operate only when the automobile is moving at high speeds. In a sense, therefore, the insulated battery box is counterproductive in cooling the battery and maintaining the battery at proper operating temperatures.

It would, therefore, be of substantial advantage in the art to provide a protective and insulating cover for a battery which not only prevents the battery from being excessively heated by adjacent heating devices, but also allows the battery to be cooled, in the normal manner, by air passing over the battery cover during movement of the automobile and by convection when the automobile is travelling at low speeds or is stationary. It would further be a very substantial advantage to the art to provide the above with, essentially, little increase in the real estate required for the battery and battery cover.

BRIEF DESCRIPTION OF THE INVENTION

The present improved battery cover is based on three primary discoveries and several subsidiary discoveries. As a primary discovery, it was found that the battery could be adequately protected from excessive temperatures, even when adjacent to a heat-generating source, such as a manifold, when only that portion of the battery adjacent such heat-generating source is protected by insulation and the remainder of the battery is not so insulated. This allows protection from direct generation of heat from the heat source, while at the same time allows air flowing over the uninsulated portions of the battery cover to cool the battery, substantially in the same manner as a battery with no cover at all. As a subsidiary discovery in this regard, it was found that such strategically placed insulation only slightly increased the real estate required for the battery and the battery cover.

As a second primary discovery, it was found that in order to ensure that the limited insulation is correctly placed such that it will disrupt the flow of heat from such heat source to the battery, the insulation must be placed on a rigid support therefor such that when the support is placed on the battery, the insulation, automatically, is also placed at the correct strategic position for interrupting such heat flow. As a subsidiary discovery in this regard, it was found that with such rigid support and with the insulation disposed on that support at the strategic place (or places), the rigid support, at least constituting part of the cover, could be removed and replaced, for servicing the battery, while ensuring that, when replacing the support, the insulation was, again, automatically positioned in the strategic place for interrupting heat flow. As can be appreciated from the foregoing, therefore, that support must be sufficiently rigid so as to be self supporting. This allows that support to be removed and replaced on the battery while maintaining the insulation at the correct position.

As a further subsidiary discovery, the insulation may be easily moved from one position on the support to another position, as may be dictated by changing positions of the real estate occupied by the battery. This provides great flexibility in the manufacture of automobiles, insofar as the battery is concerned, and especially as opposed to fixed insulation battery boxes, e.g. a double-walled box.

As a further important discovery, it was found that such a support could easily be achieved where the support has at least a top wall and side walls which are sufficiently rigid so as to be self supporting. With this arrangement, the cover may be slid onto the battery, from the top of the battery, and contact the battery tray on which the battery rests. With this arrangement, the support can be easily removed from and replaced on the battery, while at the same time ensuring that the insulation will be properly positioned for intercepting heat from a heat source.

As a further important discovery in this latter regard, with such a rigid support, the heat insulation can be disposed on only at least a portion of one of the walls of the support, e.g. a side wall of the support facing the heat source, and still provide adequate interruption of heat flow from an adjacent heat source. Thus, where the heat source is of small dimensions, adequate interruption of heat flow can be achieved by placing a small portion of insulation on only a portion of the cover, e.g. a side wall facing the limited dimension of the heat source, and thus reducing the cost of the battery cover and the real estate required thereby.

As a further important discovery, it was found that the insulation disposed on the support must be enclosed in an envelope of plastic material. Such an envelope of plastic material will provide a container for positioning the insulation on a wall of the support and, also, will protect the insulation from deleterious contaminations, such as water or oil which could be splashed on the insulation during operation and servicing of the vehicle and will also prevent contamination by battery gases expelled from the battery during charging.

Finally, as an important discovery, it was found that an attaching means for attaching the envelope to at least a portion of at least one wall of the support will provide great flexibility as to where the insulation is attached to the wall of the support. This will accommodate, with little change in manufacturing procedure, a variety of insulation positions for the insulation on the support, as is needed with the size and location of the battery under the hood of a particular automobile. This is opposed to situations where the insulation is integrally formed with or placed in a wall of the support such as a double-walled support, e.g. during molding of the support, since with such a manner of providing the insulation little flexibility can be provided in manufacture, other than hand techniques, for accommodating different sizes of batteries and different positions of the battery under the hood of an automobile.

Thus, very briefly stated, the present invention provides a protective and in part heat-insulating cover for a battery. The cover comprises a molded rigid plastic support having at least a top wall and side walls, which walls are sufficiently rigid so as to be self supporting. Heat insulation is disposed on at least a portion of at least one wall, and an envelope of plastic material encloses the insulation. Attachment means are provided for attaching the envelope to at least a portion of at least one wall.

DETAILED DESCRIPTION OF PREFERRED EMBODIMENTS

Figure 1:
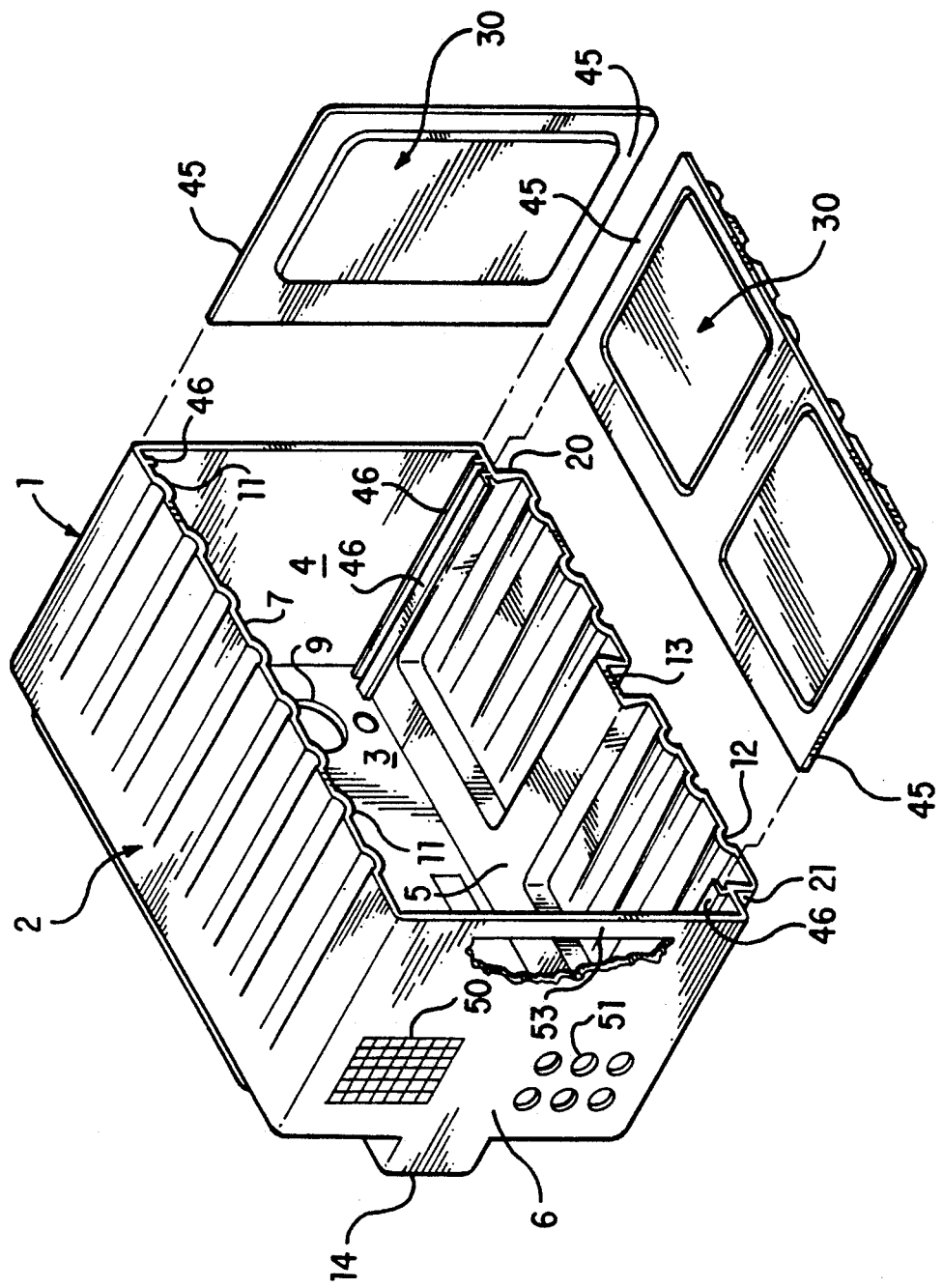
FIG. 1 is an isometric exploded bottom view of the present cover.

As shown in FIG. 1, a preferred embodiment of the invention as described above, comprises a cover, generally 1, which has a molded rigid plastic support, generally 2, having at least a top wall 3 and side walls 4, 5, 6 and 7. In this preferred embodiment, the cover is shown in rectangular configuration, but it will be appreciated that the configuration need not be rectangular, but can be any desired configuration so long as the walls essentially snugly cover the battery. In automobile application, of course, the configuration of the cover should very closely approximate that of the battery in order to conserve real estate, but where real estate is not a difficulty, then the configuration of the cover may be as desired. Similarly, while the preferred embodiment being discussed is rectangular and, therefore, has four side walls, with other configurations, only three side walls, e.g. a triangular configuration, may be used, or, in some batteries and for certain purposes, the configuration may be circular, where only, essentially, one side wall of the cover is provided.

However, for purposes of illustrating the invention with the preferred embodiment being discussed, the cover 1 will have one or more apertures 9 (only two being shown) for receiving electrical cables or the battery terminals to which the electrical cables are attached or for venting the cover or for attaching carrying straps. The apertures, of course, may be positioned in locations different from that shown in FIG. 1, to accommodate the particular battery involved, e.g. apertures in a side wall, or, in certain cases, instead of apertures, indentations in the top or side walls may be used for passing electrical cables through the cover for attachment to the battery, in the manner of battery cases for marine batteries. In such cases, the top wall may be removably attached by conventional releasable attachment means for removing the top wall and for securing the battery, e.g. conventional clamps, bolts, etc, or simply a friction fit between the top walls and side walls (see FIG. 1).

The side walls, and, indeed, the top wall, may be of planar configuration, as shown, for example, by side walls 4 and 6, or the walls may have special configurations for strengthening the walls, such as thickened portions 11 or rigidity-increasing sections such as oval sections 12 or rectangular sections 13.

The top wall 3 may also have special configurations, such as protuberances 14 for accommodating parts of the connecting electrical cables or parts of the battery, e.g. terminal posts and/or access caps appropriate to electrolyte filler ports of the battery for filling with electrolyte and water, etc.

Alternatively, all of the side walls of the cover may be essentially planar, and separate inserts 20 may be slid onto a wall and locked thereto by a suitable means, such as cooperating tabs 21. These inserts, instead of the walls, may have desired configurations for strengthening and increasing the rigidity of the cover and/or for receiving the envelope 30 containing the insulation, as described below.

Figure 2:
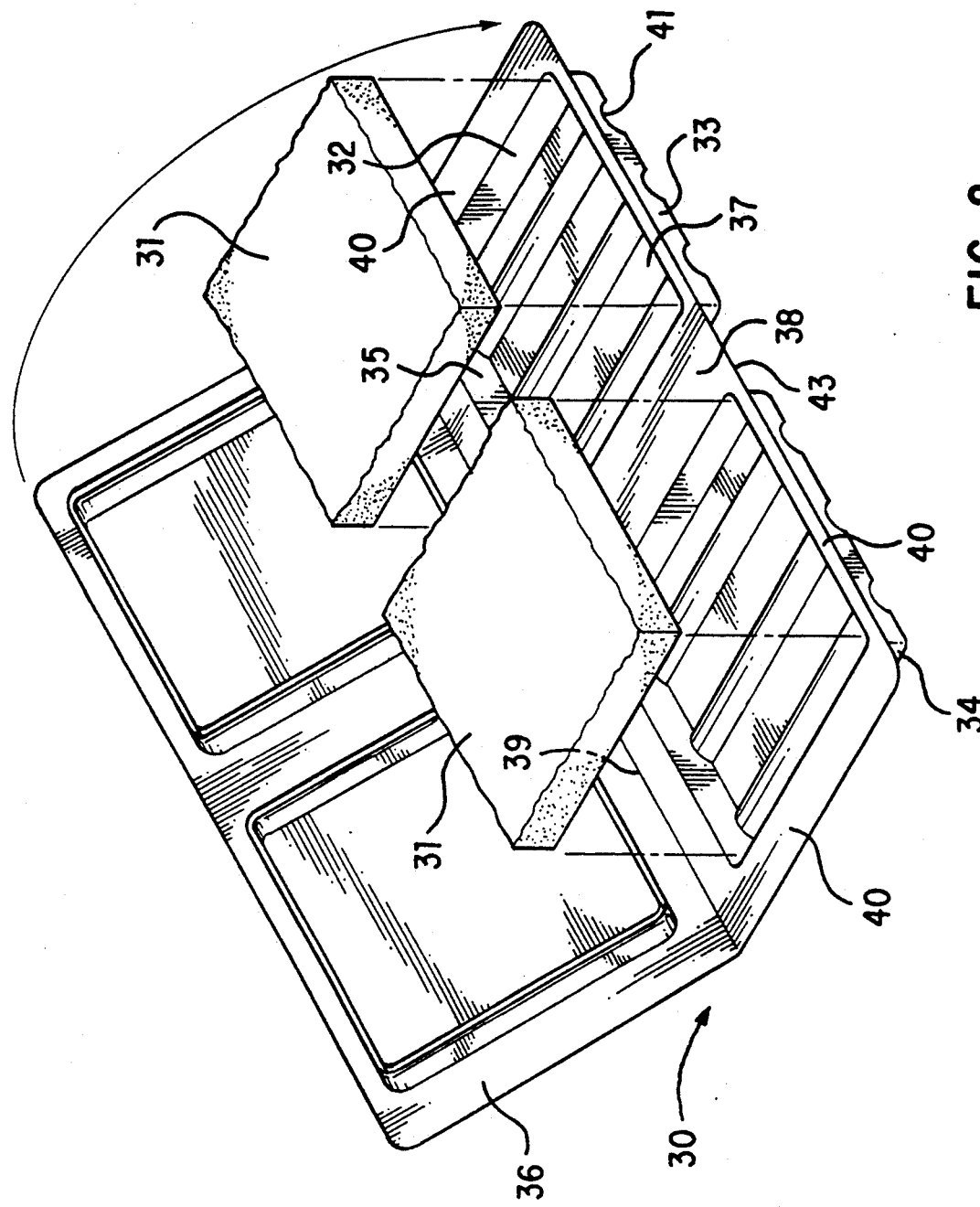
FIG. 2 is an isometric exploded view of the insulation and envelope therefor.

In this latter regard, FIG. 2 shows a preferred embodiment of the envelope containing the insulation. As seen from FIG. 2, the envelope, generally, 30 is made of a plastic material and encloses the insulation 31 (the envelope of FIG. 2 being shown in partially exploded configuration). The envelope 30 has envelope side walls 32, 33, 34 and 35, top wall 36 and bottom wall 37, which, when assembled, encloses insulation 31. Of course, the envelope may take other forms, such as simply a flexible pouch, but the preferred embodiment shown in FIG. 2 provides special advantages in manufacture and assembly which would not be provided by flexible pouches and the like.

As shown in FIG. 2, bottom wall 37 receives insulation between side walls 32, 33, 34 and 35. For a particular battery intended to be placed at a particular position in a particular automobile, the envelope 30 may be molded of a relatively rigid plastic with compartments for receiving the insulation molded thereinto. In the example shown in FIG. 2, a compartment is constituted by side walls 32, 33, a portion of top wall 36, a portion of bottom wall 37 and separator 38. The so-formed compartment is sized so as to snugly receive pre-cut and pre-sized insulation 31. A similar compartment for receiving a similar sized and cut piece of insulation 31 is shown also in FIG. 2.

Thus, after molding the envelope, the envelope can be quickly and easily assembled with the insulation prepositioned at the strategic locations, simply by placing the pre-cut insulation in the so-formed compartments, closing top wall 36, e.g. at hinged edge 39, and sealing top wall 36 to the envelope, at least around the edges 40. That sealing may be by adhesives, glue, thermowelding, ultrasonic welding, or as desired. The so-formed envelope is, therefore, easily positioned on the support, and will automatically place the insulation at a strategic location or locations. That envelope can be inexpensively manufactured, in view of the above, and will occupy minimum space.

One or more of the walls of the envelope may have rigid-producing configurations, again, such as oval sections 41 and rectangular sections 43, or the walls may be substantially planar. When these sections, e.g. sections 41 and 43, are complimentary to the sections 12 and 13 (see FIG. 1) of a molded wall or an insert, as explained above, then by simply sliding envelope 30 onto that complimentary configured wall or insert the envelope is automatically positioned on the support, and, hence, the insulation, at the strategic location for heat interruption, as explained above. Those rigid-producing configurations may also include the attachment means, e.g. mechanical attachment means, for attaching the envelope to the wall. As shown in FIG. 1, the envelope may have tabs 45 (which may be the same as edges 40 or extensions thereof) which fit into complimentary grooves 46, such that by simply sliding the tabs 45 into grooves 46, the envelope is not only properly positioned on the wall, but it is attached thereto by mechanical attachment means such that the envelope may be removed, if desired, when servicing the battery or otherwise cleaning or washing the battery cover. Alternatively, the envelope may be repositioned on the support.

In this latter regard, while the invention is applicable to any type of battery, often, the cover will be used in connection with a wet cell battery, e.g. a conventional automobile battery, and, of course, the support 2 will be configured to receive such a wet cell battery. These wet cell batteries are often lead/acid batteries, and it may be desirable, from time to time, particularly with non-sealed batteries, to remove the battery cover and clean that cover of accumulated deposits, e.g. condensation from battery gases and the like.

The molded plastic support 2 may be made by a variety of methods, including blow molding, casting, and injection molding, but it is preferred that injection molding be used, since this allows quick production and very different configurations of the support 2. This is particularly true when the support is configured to have a top wall and four side walls, since injection molding quite easily achieves that configuration. This is further true when the cross-section of the support is rectangular, as shown by the opened bottom thereof in FIG. 1.

The rigid plastic of the support should be a heat-resistant plastic and any heat-resistant plastic in this regard may be used. However, the rigid plastic may be made of one or more of polyolefins, acrylates, nylon, polyamides, polyesters, ABS, polycarbonates, phenolics, polyvinyl chloride, polystyrene, and polyacrylonitriles, among others. Polyolefins, e.g. high density polypropylene, is a preferred plastic, since it provides good rigidity with low wall thicknesses, e.g. one quarter inch or less, usually about one eighth inch or less, e.g. one thirty-second to three thirty-seconds inch in thickness. This material is also resistant to solvents, which might be encountered in an engine, e.g. oil, as well as water and corrosive battery fumes. High density polypropylene is also quite amenable to injection molding, the preferred form of the method of making the cover.

Turning again to FIG. 1, it will be appreciated that as shown in that preferred embodiment, there is no particular means for attaching the cover to the battery. While mechanical clamps, cables, turnbuckles, screws and the like could be used, for ease of placement of the cover over the battery during manufacture of an automobile, or for removal and replacement during servicing, the cover is preferably configured to achieve a friction fit with the battery. In this regard, the configuration of the support 2 and the envelope 30 (or envelopes 30), if placed on the inside of the support, are such that at least one axial dimension of the support and/or envelope is slightly less than a corresponding axial dimension of the battery. For example, the axial dimension of side wall 5 (or an envelope or envelopes 30 thereon) to side wall 7 (or envelope or envelopes thereon) may be slightly less than the corresponding axial dimension of the battery, e.g. one thirty-second to one-half inch less. Accordingly, when the support 2 (with the envelope thereon) is slid over the battery, at least one of side walls 5 and 7 of the support 2 is flexed outwardly to receive the battery. This provides a friction fit between the battery and the support, since after the cover is placed on the battery, the flexed wall will return inwardly and provide that friction fit. With this friction fit arrangement, of course, at least one of the side walls is sufficiently resilient so as to be outwardly flexed for achieving the placement of the cover over the battery and the friction fit achieved thereby. This is a very simple and inexpensive method of attaching the cover to the battery, especially in original manufacture automobile assembly lines, and requires no special steps in manufacture and no special components for such attachment. The friction fit also essentially eliminates rattling of the cover, especially when the envelope is fused to the support, as explained in more detail below.

Figure 3:
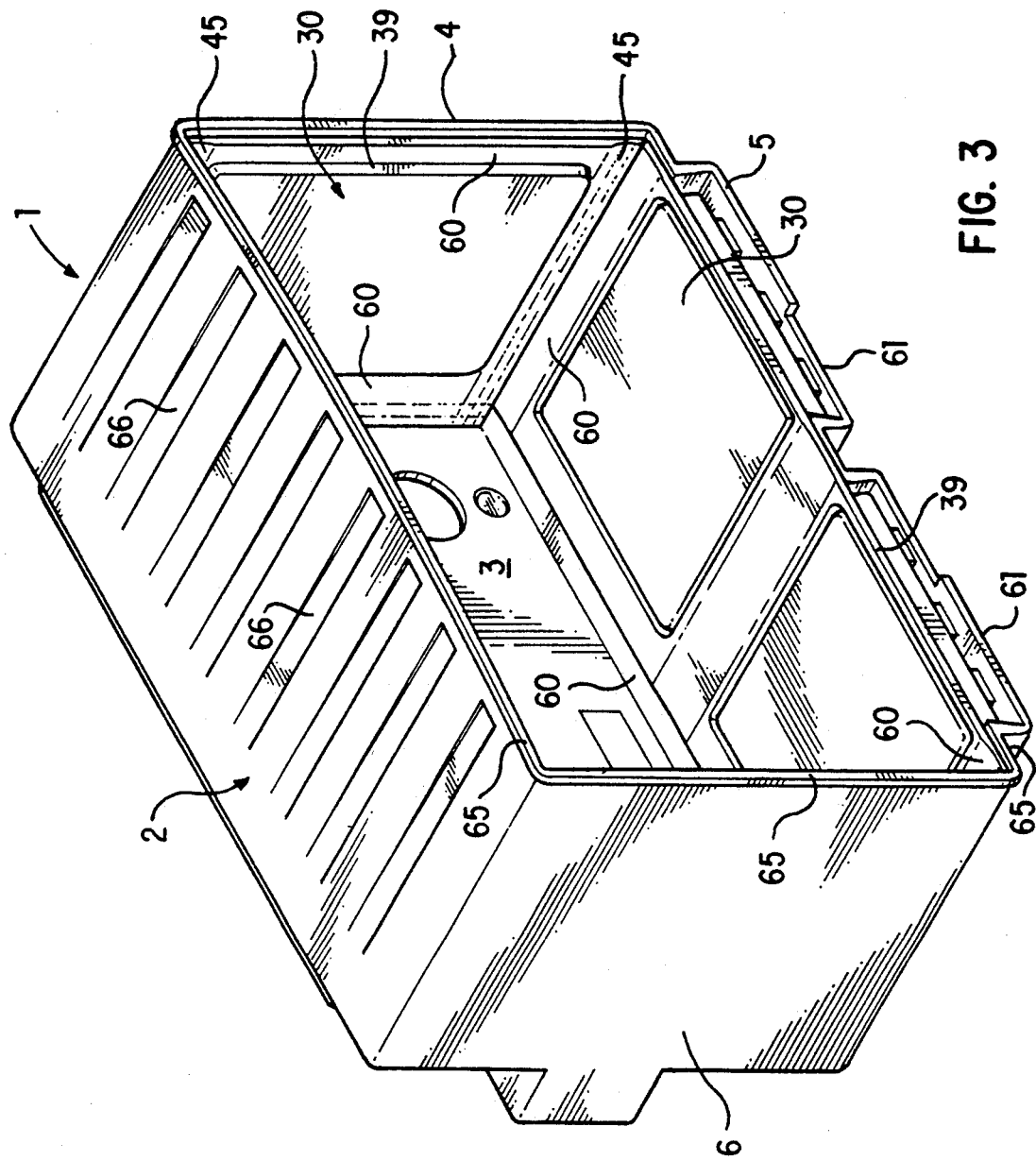
FIG. 3 is a modification of FIG. 1.

In this latter regard, FIG. 3 shows a modification of FIG. 1, which modification is preferred when the battery cover is intended for original manufacture of a particular vehicle with a particular battery placement adjacent heat sources. In FIG. 3, the elements of FIG. 1 have the same reference numerals. In this modification, the envelopes 30 are attached to, for example, the inside walls 4 and 5 by welds 60 along tabs 45 (or edges 40), preferably, with the hinged edge 39 being toward the bottom of the support 2 of cover 1. Indeed, the welds 60 may be made along tabs 45 (or edges 40) without the edges 40 having been previously welded as explained above in connection with fabrication of the envelope. This eliminates a separate weld along edges 40 when fabricating the envelope 30. Also, preferably, wall 5 has indentations 61 for receiving the envelope 30, since this accurately positions envelope 30, but this need not be provided and envelope 30 may simply be welded by welds 60 to the inside surface of, for example, wall 4, or other walls, as shown in FIG. 3. Indeed, the resilient envelope 30 on wall 4, when properly spaced to snugly fit a battery, will increase the friction fit and aid in very quick automobile assembly, as discussed above.

To make this modification more rigid and more robust, it may also be provided with a bottom lip 65, as well as rigidity-inducing depressions 66.

These prepositioned and welded envelopes make the support 2 quite sturdy, as does the indentations 61, depressions 66 and lip 65, which allows rough handling in automobile assembly. The modification of FIG. 3, especially, also provide a very pleasing appearance to the cover, which is becoming more important in automobile manufacturing.

The insulation can be chosen as desired, including one or more of plastic, including foamed plastic, ceramic, glass, natural minerals, cellulose, asbestos, and the like. This is particularly true, since insulation is contained within the envelope, and the insulation need not be self supporting. Indeed, the insulation could be a dead air space or vacuum. However, it is preferred that the insulation is in particulate form, since this generally provides better insulating properties, and particularly where that particulate form is in a fibrous form. Fibers provide greater insulation and are, therefore, the preferred form. The insulation may be in the form of a non-woven or woven batt with or without binders. Particularly preferred are insulations made of one or more of polyester fibers, nylon fibers, glass fibers, ceramic fibers, and the like. The most preferred insulation is commercially available as LYTHERM, which is a composite of a glass fiber web and a polyester fiber web. The thickness of the insulation will, generally, be between about one-eighth inch and one inch, especially about one-quarter to one-half inch.

As discussed above, in the preferred form of the invention, the plastic material of the envelope provides a shape-sustaining form of the envelope. However, this need not be true, as explained above in connection with a flexible envelope. Thus, the plastic material of the envelope may be the same as or may be different from the rigid plastic of the support. In the preferred embodiment, the plastic material of the envelope is one or more of polyolefins, especially the same high density polypropylene, nylon, acrylates, polyamides, polyesters, ABS, polycarbonates, polyvinyl chloride, and polystyrene, although other polymers may be used as desired. The thickness of the walls of the envelope may be the same as those of the support, as explained above, but are more usually of thicknesses in the low end of that range, e.g. one thirty-second to three thirty-seconds inch, although other thicknesses may be used.

Also as explained above, the attachment means of the envelope may be a mechanical attachment means, such as the tabs illustrated in FIG. 1, but other mechanical means may be used, as desired, e.g. screws, bolts, brads, rivets or other fasteners, clamps, and the like. Also, as noted above, the attachment means may be an adhesive or a weld, e.g. a thermoweld, for example, where tabs 45 or edges 40 (see FIG. 3) are glued to or welded to wall 4, e.g. ultrasonically welded. In this case, the adhesive or weld will permanently attach the envelope to the support, as opposed to the mechanical attachment means which may allow removal of the envelope, as discussed above.

In either case, the attachment means should attach the envelope to at least one wall of the cover, such that the insulation will be placed between the battery and a heat source adjacent to the battery. Of course, insulation may be placed on more than one wall, as shown in FIGS. 1 and 3, or it may be placed on only a portion of one wall. For example, in a particular environment, it may be that only a portion of the right-hand wall, i.e. wall 4, of FIG. 1 need be protected by insulation. In that situation, the envelope 30 may be loaded only with the one portion of insulation 31 and, thereafter, closed and sealed as explained above.

While FIGS. 1 and 3 show the insulation 31 on the inside of the walls of support 2, quite obviously, the insulation could be placed on the outside of the walls of the cover, and attached in manners as described above. However, since the protection provided by plastic of envelope 30 will generally be less than the protection provided by the walls of the cover, it is preferred that the insulation be disposed on the inside of the walls of support 2.

It will also be quite obvious that the top wall 36 of the envelope (see FIG. 2) need not be used, and the envelope with the insulation placed therein may be positioned on a wall of support 2, in the manner shown in FIGS. 1 and 3, and the envelope attached to that wall by the attachment means described above. However, it will be appreciated in this regard that if the attachment means is a mechanical means, then the insulation will not be sealed between, for example, wall 4 and envelope 30. Thus, in this embodiment, it is much preferred that the envelope, without a top wall 36, be an adhered or welded to that wall, as explained above, in order to seal insulation 31 between the envelope 30 and wall 4.

It will also be quite obvious that the walls of support 2 need not be continuous and may have apertures, holes, gratings and the like therein for ventilation, e.g. as illustrated by gratings 50 and holes 51. However, this is not a preferred embodiment, since, while such apertures and the like will improve ventilation and cooling of the battery, such apertures and the like will also allow ingress of contaminants into the cover. In many installations, this will not be a problem, but in connection with an automobile installation, this allows a potential for contamination of the cover from oil, water and the like, and is not preferred.

Also, quite obviously, support 2 may have a bottom wall, although this is not usually necessary. However, in certain battery installations, where the heat source is at least in part below the battery, then insulation between that below heat source and the battery is desirable. That insulation can take the form of a bottom wall 40 attached to support 2 by any convenient mechanical means or friction fit, or it may take the form of simply a layer of insulation placed between the battery tray and the battery. Such layer of insulation, most preferably, will be contained in an envelope, as described above. Alternatively, the insulation may be of an inexpensive material, designed to be replaced with each servicing of the battery or when the insulation becomes contaminated.

It will also be easily appreciated that in the usual situation, especially in regard to automobile batteries, only one wall of the cover, and possibly two walls of the cover, will face heat sources and, hence, only one or two walls of the cover need be insulated in the manner described above. More usually, only one wall of the cover need be so insulated, but in certain cases, it may be necessary to insulate any or all of the walls of the cover.

Further, in certain installations, the top wall of the cover is not necessary, at least as a full top wall, and may not be included in the cover, since a heat source above the battery is unlikely. However, here again, this allows the possibility of contamination of the cover, and is not a preferred embodiment.

As discussed above, the walls of the cover must be sufficiently rigid so as to be self supporting. Depending upon the particular plastic involved, such self supporting structure can be provided with only minimal wall sections, for example, where an engineering plastic is used to produce the cover, e.g. polycarbonate and high density polypropylene. For example, where all, or most, of the walls are to be covered with insulating envelopes, the cover may be made of only support strips attached to each other forming the walls. For example, the support strips may form only a small area at the edges of the cover, with the wall areas being open, as illustrated by partially shown strips 53 (see FIG. 1). The envelopes are then placed in this cage-like support to form one or more walls for heat insulation and protection purposes. However, this would be useful only in a limited number of situations, and is not a preferred embodiment. Nevertheless, such embodiment could be used where additional ventilation is required for the battery. For example, with such a cage-like structure where the strips form the walls, and, perhaps, only two of the opened wall areas are covered by insulation within envelopes, the remainder of the wall areas are entirely open, except for the supports in the form of strips 53 at the edges of the cover. This will very substantially increase ventilation for cooling of the battery.

Especially where the walls are not complete walls but with significant apertures, gratings, grills, and the like, as well as being formed by only supporting strips as described above, more rigid plastics and plastics formulated for greater rigidity should be used. For example, rigidity can be increased in most plastics by the use of particulate fillers, e.g. talc, carbon black, diatomaceous earth, kaolin, as well as other clays, and the like, and hollow glass or plastic spheres. Rigidity can also be increased by including reinforcement in the plastic, e.g. glass fibers, carbon fibers, high modulus plastic fibers, and the like. However, usually, very conventional talc filler is quite satisfactory. Rigidity can also be increased by the cross-sectional shapes of the walls or support strips, and especially in regard to the latter, e.g. cross-sectional wall shapes of the support strip being triangular or at least angular, or in the form of an I-beam and the like. Reinforcements and fillers can be included in the plastic in amounts from 0 to 40% by weight, or more, if desired.

Also, rigidity can be increased by forming the walls or support strips in the manner well known to the art which results in the molding having a tough impervious outer shell and a foamed or partially foamed inner core. The technique of so molding is referred to the in art as a "two-shot" injection molding technique where a foamable resin is injected into a non-foamable resin during the molding operation to produce the sheath-/core molding. Indeed, for greater rigidity, especially in special purposes, all of the walls may be made in a sheath-core manner so as to provide greater rigidity to the cover. The foamed core will, also, provide some insulation of the walls, and in some cases, some permanently disposed insulation in some portions of the walls can be achieved by such a sheath/core molding where the amount of foamable resin in a particular portion of the wall or walls is sufficient to achieve substantial insulation of that portion.

Having described the invention, it will be apparent to those skilled in the art that the invention is susceptible to numerous modifications and changes, and it is intended that those modifications and changes be included within the scope and breadth of the annexed claims.

What is claimed is:

1. A protective and, at least in part heat-insulating cover for a battery comprising:
    (A) a molded rigid, plastic support having at least a top wall and side walls, which walls are sufficiently rigid so as to be self-supporting;
    (B) heat insulation disposed on at least a portion of at least one wall;
    (C) an envelope of plastic material enclosing the insulation; and
    (D) attachment means for attaching the envelope to at least a portion of at least one wall.

2. The cover of claim 1 wherein the support is configured to receive a wet cell battery.

3. The cover of claim 2 wherein the wet cell battery is a lead/acid battery.

4. The cover of claim 2 wherein the battery is an automobile battery.

5. The cover of claim 1 wherein the molded plastic support is injection molded.

6. The cover of claim 1 wherein the support has a top wall and four side walls.

7. The cover of claim 6 wherein a cross-section of the support is rectangular.

8. The cover of claim 1 wherein the rigid plastic is a heat-resistant plastic.

9. The cover of claim 8 wherein the rigid plastic is one or more of polyolefins, nylon, acrylates, polyamides, polyesters, ABS, polycarbonates, phenolics, polyvinyl chloride, polystyrene and polyacrylonitriles.

10. The cover of claim 1 wherein the configuration of the support and the envelope are such that at least one axial dimension of the support and envelope is slightly less than a corresponding axial dimension of the battery, such that when the support with the envelope thereon is slid over the battery at least one side wall of the support is flexed outwardly to receive the battery and provide a friction fit between the battery and the support.

11. The cover of claim 10 wherein at least one of the side walls is sufficiently resilient so as to be outwardly flexed.

12. The cover of claim 1 wherein the heat insulation is one or more of plastic, ceramic, glass, natural minerals, cellulose and asbestos.

13. The cover of claim 12 wherein the insulation is in particulate form.

14. The cover of claim 13 wherein the particulate form is a fibrous form.

15. The cover of claim 1 wherein the plastic material of the envelope is the same as the rigid plastic of the support.

16. The cover of claim 15 wherein the plastic material is one or more of polyolefins, nylon, acrylates, polyamides, polyesters, ABS, polycarbonates, polyvinyl chloride, and polystyrene.

17. The cover of claim 1 wherein the attachment means is a mechanical attachment means.

18. The cover of claim 1 wherein the attachment means is an adhesive or weld.

19. The cover of claim 17 wherein the mechanical attachment means allows removal of the envelope.

20. The cover of claim 18 wherein the adhesive or weld permanently attaches the envelope to the wall.

21. The cover of claim 20 wherein the envelope has no top wall and the insulation is between the cover and a bottom wall of the envelope.

22. The cover of claim 1 wherein at least one wall has a rigidity increasing configuration selected from the group consisting of thickened portions, oval sections and rectangular sections.

23. The cover of claim 1 wherein the wall thicknesses are between about one thirty-second and one-quarter inch thick.

24. The cove of claim 1 wherein the insulation is between about one-eighth and one inch thick.

* * * * *